Aug. 19, 1958 W. W. PHARIS 2,848,550

CODE CALL CIRCUIT

Filed Feb. 3, 1956 5 Sheets-Sheet 1

INVENTOR,
WILLIAM W. PHARIS
BY
ATTORNEY

Aug. 19, 1958 W. W. PHARIS 2,848,550

CODE CALL CIRCUIT

Filed Feb. 3, 1956 5 Sheets-Sheet 2

Aug. 19, 1958 W. W. PHARIS 2,848,550

CODE CALL CIRCUIT

Filed Feb. 3, 1956 5 Sheets-Sheet 3

Aug. 19, 1958 W. W. PHARIS 2,848,550

CODE CALL CIRCUIT

Filed Feb. 3, 1956 5 Sheets-Sheet 4

CODE CALL CIRCUIT
120

Aug. 19, 1958 W. W. PHARIS 2,848,550

CODE CALL CIRCUIT

Filed Feb. 3, 1956 5 Sheets-Sheet 5

United States Patent Office 2,848,550

Patented Aug. 19, 1958

2,848,550

CODE CALL CIRCUIT

William W. Pharis, Rochester, N. Y., assignor to General Dynamics Corporation, Rochester, N. Y., a corporation of Delaware Application February 3, 1956, Serial No. 563,219

8 Claims. (Cl. 179—18)

This invention relates to telephone systems and more particularly to code call circuits for use in such systems.

A typical telephone system is provided with means for extending calls from calling subscriber lines to called subscriber lines. Usually, there is no need to do more than merely to ring a telephone of a called subscriber. Either he answers or he does not answer depending upon whether he is or is not near the location of his telephone.

Under some circumstances it may be necessary to do more than merely to ring the called phone. For example, the called subscriber may not be at a location where he can hear his bell when it rings. Thus, he is not aware of the fact that he is being called; however, he may be in the general area, as in a factory, for example. Under these circumstances, it is desirable to have some means for paging or otherwise signaling him. Further, despite the fact that he is not near his telephone, a called subscriber should have some means by which he may converse with a calling subscriber.

One method of paging is to provide means which is known in the art as "code call" signaling. Usually, this function is provided by a device such as a bell, gong, buzzer, or the like. Obviously, various signals other than sounding devices could be used, for example, signaling could be by means of flashing lights. This signaling device may be operated in a particular sequence to signal a called subscriber. To illustrate, assume that a bell is struck three times, then there is a brief period of silence, and finally a bell is struck two times. In this case the code call number "3–2" has been sounded. Then, the person having this number assigned to him goes to a nearby telephone and dials a predetermined number which is assigned to provide means for answering such code calls. Means is provided to direct an answering call to a code call circuit which has been seized previously by the calling subscriber. The transmission of coded signals is terminated when a called subscriber answers. The subscribers may now converse through the code call circuit.

Still another reason for using code call equipment is to provide means for emergency signaling during a fire, disaster, or the like. In this case, a code call apparatus is seized upon the occurrence of an alarm indicating condition. Responsive thereto, the code call apparatus automatically transmits a certain distinctive emergency signal. For example, an emergency alarm may be steady ringing or tapping of a bell that is used on other occasions to signal a called subscriber. Hence, a code call circuit should be arranged so that general alarms, fire alarms, emergency alarms and the like may take precedence over other code calls if any are in process at that time.

An object of this invention is to provide a new and improved code call circuit.

Another object of this invention is to clear a code call circuit of stored digit indication if a general alarm is indicated while the circuit is busy on a regular code call.

A further object of this invention is to release switching means extending to the calling subscriber if there is a general alarm while a code call circuit is busy.

Still another object of this invention is to give access to a code call circuit from an attendant's cabinet during periods of general alarms.

Yet a further object of this invention is to provide means whereby an attendant may dial an area alarm code to switch the transmitted alarm signal from a general alarm to an area alarm code.

This invention accomplishes these and other objects by providing means for controlling the transmission of code call signals in the form of a code call circuit which may be controlled from a calling subscriber line during regular code calls. The circuit also includes means responsive to an alarm condition for silencing any code call signaling which may then be in process. A ground marking that may be extended from a code call circuit to hold calling switch equipment is removed briefly when a general alarm is received so that the calling switch equipment, if any, may be released. After the switch equipment has released, a marking is applied to mark the code call circuit as busy to other calls—with one exception. That is, even after a busy marking has been reapplied, an attendant may seize the code call circuit, override any general alarm signaling then in progress and change the signal to an area alarm, as required.

It is thought that these and other objects will be obvious from a study of the attached drawings, in which.

Figure 1:
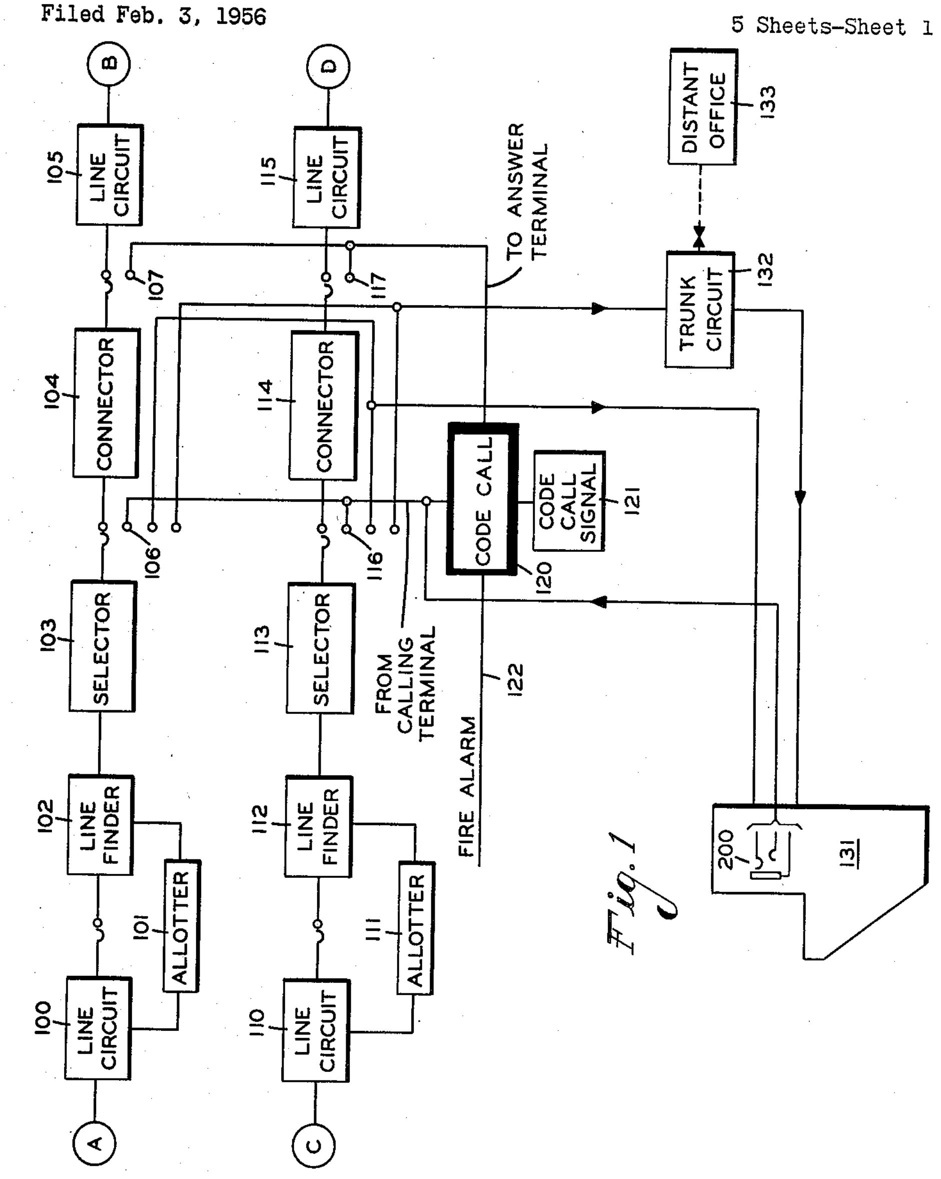
Fig. 1 shows by block diagram a telephone system adapted to use the invention.

Energy for the system shown and described herein is provided by means of a source of office potential shown in the drawings by means of plus (+) and minus (−) signs. As is the case in most telephone circuits, the plus or positive terminal is described as being connected with ground; hence, the terms "(−) battery" and "ground (+)" are used hereinafter. It should be obvious that this or any other suitable source of potential may be used.

The code call circuit that is shown in Fig. 1 by heavily inked rectangle 120 indicates that portion of the system which is shown in detail in the remainder of the drawings. The remaining boxes in Fig. 1 that are shown by lightly inked rectangles are items which are well known to those skilled in the art. Any suitable equipment may be used to provide the functions represented by these boxes. I have tried to use simple and specific terms where possible to facilitate an understanding of my invention; however, I want it understood that the use of these specific terms is not to act in any manner as a disclaimer of the full range of equivalents which is normally given under established rules of patent law.

*Brief description*

The invention may be described briefly by making reference to Fig. 1 in which a telephone system is shown by hollow rectangles. The subscriber at station A may initiate a call by removing his receiver thereby completing a loop to line circuit 100. Allotter 101 and finder 102 cooperate to find the calling line. Then the subscriber dials any suitable number of digit pulses to direct selector 103 further to extend the call to the desired destination. For example, if subscriber A transmits a suitable directory number, connector 104 is directed to seize line circuit 105. On the other hand, if the calling subscriber dials another directory number, he may seize trunk circuit 132 thereby gaining access to a distant office 133. If calling subscriber A dials still another directory number, he may have access to code call circuit 120 over point of access 106. In this manner a calling subscriber is provided with means for extending his line to a code call circuit.

Means is provided in the code call circuit for registering digits that designate a subscriber who is being paged. In greater detail, subscriber A dials any suitable directory paging number to set registers in code call circuit 120. These registers then control the sounding of a distinctive signal by means of a suitable code call signal 121. This sounding is an appropriate indication for informing a called subscriber of the fact that there is a call which requires his attention. The called subscriber may go to a nearby telephone and dial a directory number when he hears that his particular code is being sounded. This number is the designation of code call answering point of access 117. For example, we may assume that a called subscriber has gone to telephone station C. He removes the receiver whereupon line circuit 110, allotter 111, and line finder 112 cooperate to extend a call to selector 113. Then, subscriber C dials a suitable directory number thereby causing selector 113 to seize connector 114 and causing connector 114 to seize point of access 117 and thus code call equipment 120. In this manner a called subscriber is provided with means for extending an answering line to a code call circuit.

Calling subscriber A and called subscriber C may now talk via line circuit 100, line finder 102, selector 103, point of access 106, code call circuit 120, point of access 117, connector 114, selector 113, line finder 112 and line circuit 110.

Let it be assumed that a general alarm occurs at a time when code call circuit 120 has been seized by a subscriber. Means is provided for seizing code call circuit 120 when a marking is applied by any suitable means (not shown) to general alarm conductor 122. Responsive thereto, means in code call circuit 120 causes it to release the calling switch equipment. Switch equipment that may be used to answer a code call is not released at this time but is made ineffective. Code call circuit 120 is marked busy to its various points of access, i. e., those numbered 106, 116, 107 and 117. Any digits which may be registered in code call circuit 120 are released when a general alarm occurs. Suitable means in code call circuit 120 causes code call signal 121 to sound in a distinctive manner thereby indicating a general alarm. Means is provided for seizing code call circuit 120 from attendant's cabinet 131 whether or not there is an alarm condition then controlling code call circuit 120 so that the attendant may override any general alarm then in progress and transmit an area alarm. Details of one circuit that may be used during a general alarm condition is shown in Figs. 2–5, and explained hereinafter in the section entitled "General Alarm."

*Detailed description*

Figure 6:
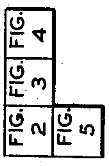
Fig. 6 shows the manner in which Figs. 2–5 should be joined to provide a complete and understandable circuit.

The following is a detailed description of the circuit shown in Figs. 2–5 which is a preferred embodiment of the code call circuit that is represented by box 120 of Fig. 1. Figs. 2–5 are to be joined in the manner that is shown by Fig. 6. The point of access that is designated in Fig. 1 by the numerals 106 and 116 is shown in the upper lefthand corner of Fig. 2. The point of access that is designated in Fig. 1 by the numerals 107 and 117 is shown in the upper righthand corner of Fig. 4.

Figure 2:
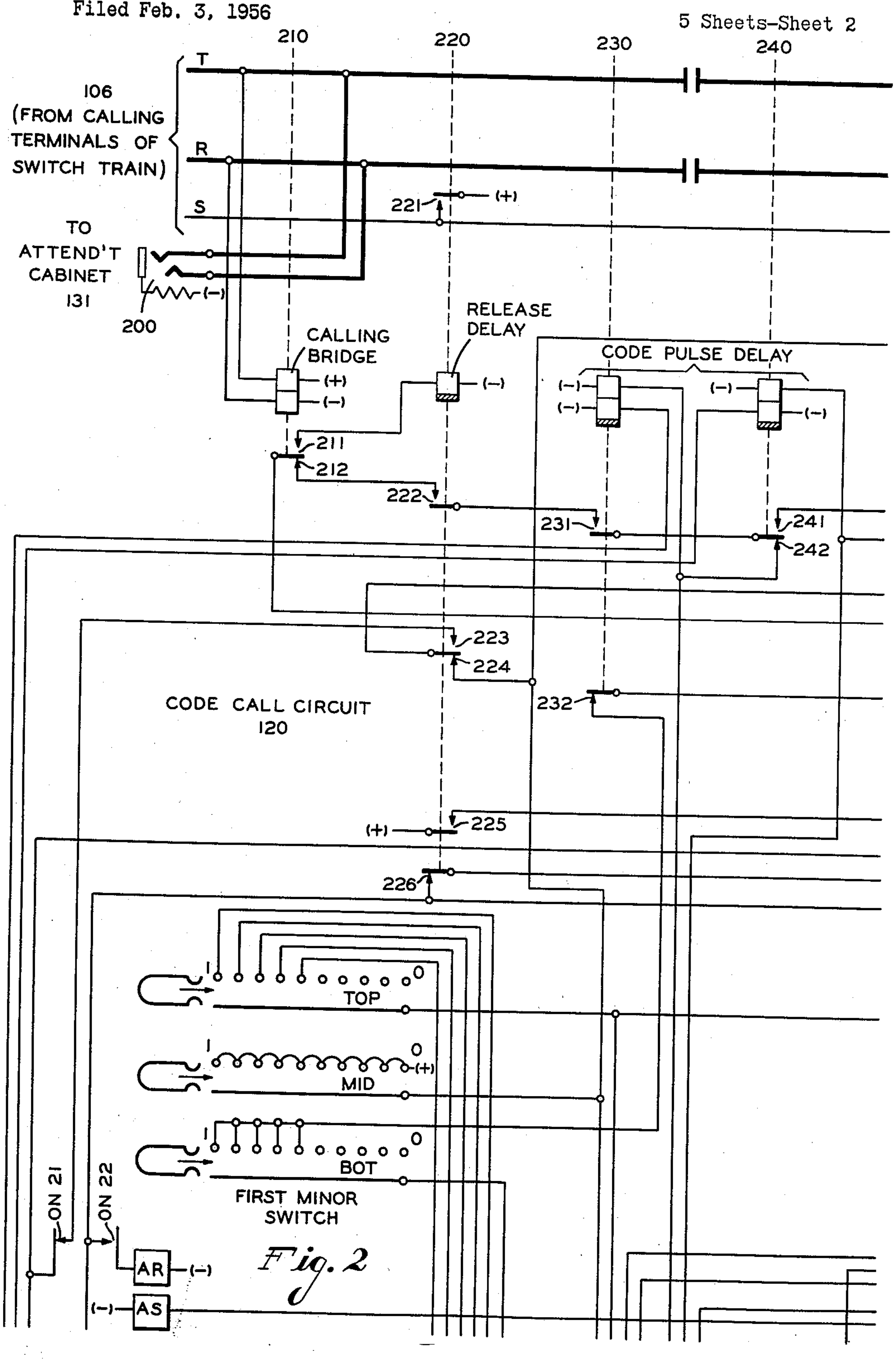
Figs. 2–5 show details of a code call circuit.
Figure 3:
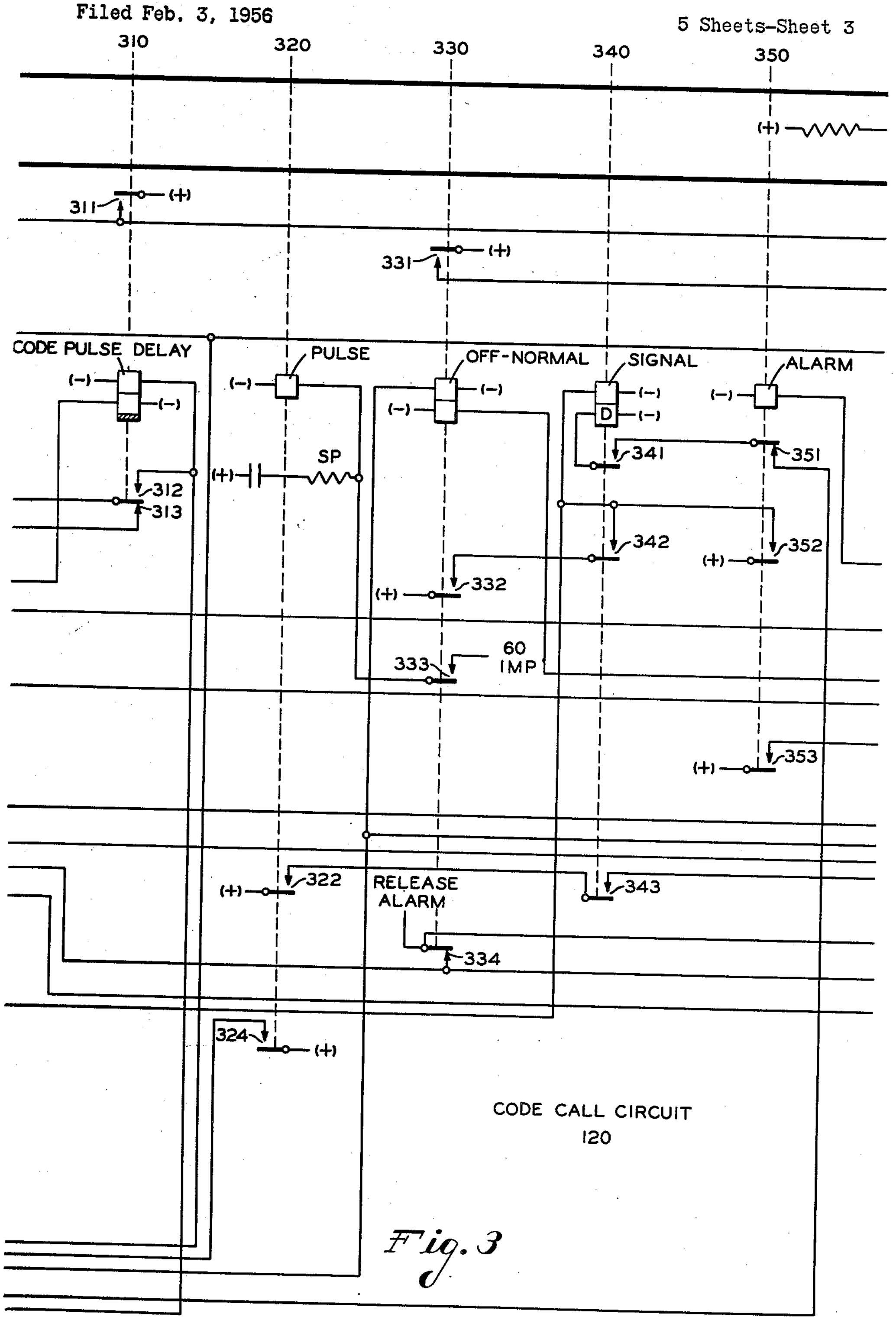

*Seizure.*—Briefly, it is assumed that a calling subscriber has directed switching means to seize conductors T and R (upper left corner of Fig. 2). Any suitable type of switching equipment may be used; however, it is assumed that means is provided for completing a loop across conductors T and R. As will be explained below, the calling bridge relay operates over this loop. Its function at this time is to seize the code call circuit. The release delay relay operates next. Among other things, it holds the preceding switch train, furnishes master ground to the code call circuit, and controls the release of various circuits at the end of a call. In addition thereto, three code pulse delay relays operate to prepare for digit pulsing. They will be used during dialing to mark the end of digit pulse trains.

In greater detail, calling bridge relay 210 operates on seizure over the circuit extending from ground (+) through the upper winding of calling bridge relay 210, conductor T, a loop through preceding equipment, conductor R and the lower winding of calling bridge relay 210 to (−) battery. Contacts 211 close thus completing a circuit that may be traced from (−) battery through the winding of release delay relay 220, operated contacts 211 and rest contacts 436 to ground (+). Release delay relay 220 operates.

Responsive to the operation of relay 220, one point in a release circuit is opened at contacts 226 because this circuit is not required until the minor switches are released after the call is terminated. A three branch circuit is completed for operating code pulse delay relays 230, 240 and 310. The common portion of this circuit may be traced from ground (+) through operated contacts 225, rest contacts 418 and various off-normal contacts. For example, one branch of the circuit extends by way of off-normal contacts ON21 and operated contacts 223 to (−) battery through the lower winding of code pulse delay relay 310. Another branch of the circuit may be traced through off-normal contacts ON51 and the lower winding of code pulse delay relay 240 to (−) battery. A third branch of the circuit may be traced through off-normal contacts ON53 and the lower winding of code pulse delay relay 230 to (−) battery. Contacts 222 close to prepare a circuit for holding the various code pulse delay relays throughout the receipt of digit pulse trains that are received later during the call and used to designate the codes that are to be transmitted.

Each of the code pulse delay relays operates and closes a circuit to prepare for the stepping of one minor switch. For example, a circuit is prepared which may be traced from ground (+) through rest contacts 436, contacts 212 (now open), operated contacts 222, 231, 241 and 312 to (−) battery through the winding of magnet AS. The code call circuit is now ready to receive subscriber transmitted digit pulses.

*Dialing.*—The signaling circuit that is used in my telephone system may be adapted to transmit digit pulses in any well known manner. For example, a few of the more common schemes are those which are known in the art as simplex, polar duplex, loop pulsing, and the like. My invention may be designed to utilize any of these or other known schemes. I have shown loop pulsing as one means for illustrating my invention. By loop pulsing, I mean a system involving a pair of talking conductors which are interconnected by impulsing contacts that are, in turn, controlled by a digit sending device. The other ends of the talking conductors are connected through the windings of a calling bridge relay. In this manner the calling bridge relay is held operated over the loop including the talking conductors and impulsing contacts so that it releases and reoperates as the digit sending device opens and closes the impulsing contacts.

Means is provided for registering code call digits in three minor switches. That is, each time that the calling bridge relay releases responsive to subscriber transmitted digit pulses, it closes contacts that operate a stepping magnet associated with one of the three minor switches. The mechanical structure of a minor switch is such that it takes one step each time that a stepping magnet operates. The various off-normal contacts marked "ON" in the drawing are opened responsive to the first step that is taken by their associated switch. As each set of off-normal contacts opens, it de-energizes a lower winding of a particular code pulse delay relay. Thereafter, that code pulse delay relay is held operated for two reasons. First, it receives a pulse like energizing current through its upper winding each time that calling bridge relay 210 releases to repeat a digit pulse. Second, it has slow release characteristics which provide a delay-in-release time that is sufficient to hold the relay operated throughout the digit pulse train. This code pulse delay relay releases at the end of the digit pulse train because it is no longer energized in such pulse fashion, the original operate circuit through its lower winding being then open. As each code pulse delay relay releases, it connects the stepping circuit to control the next minor switch until all three minor switches have been utilized to register code call digits.

Incidentally, it might be noted that the release delay relay also depends upon its slow release characteristics and upon pulse like energizing current for holding it operated until the end of a digit pulse train.

In greater detail, calling bridge relay 210 releases and reoperates responsive to each digit pulse in the first pulse train to be received. Each time that relay 210 releases, a circuit is completed from ground (+) through rest contacts 436, 212, operated contacts 222, 231, 241, 312 and the winding of first minor switch stepping magnet AS to (−) battery. The brushes of the switch designated First Minor Switch are driven one step per pulse by magnet AS until they come to rest on a particular set of terminals which is indicative of the first digit that is dialed into the code call circuit. Off-normal contacts ON21 and ON22 operate when the minor switch takes its first step. Contacts ON21 open thus de-energizing the lower winding of code pulse delay relay 310 which had been energized over the circuit including its lower winding contacts 223, ON21, 418 and 225 to ground (+). Thereafter, relay 310 is held throughout digit pulsing due to its slow release characteristics and due to the circuit extending from (−) battery through the upper winding of relay 310, operated contacts 312, 241, 231, 222, 212 and 436 to ground (+). Contacts 212 are following the digit pulses.

Relay 310 releases after the last pulse in the first digit pulse train has been received. This is because contacts 212 remain open for a period of time which is longer than the slow release time of code pulse delay relay 310. Responsive to the release of relay 310, contacts 312 open and 313 close thereby switching the stepping path from magnet AS, which is associated with the First Minor Switch, to magnet BS, which is associated with the Second Minor Switch. The first digit pulse train is now registered or stored in the First Minor Switch.

The code call circuit is now ready to receive the second digit pulse train which is transmitted by the calling subscriber. Once more, calling bridge relay 210 restores and reoperates responsive to each pulse in the second train. Contacts 212 close on each pulse and a circuit is completed for stepping the Second Minor Switch once per pulse until it comes to rest on a particular set of terminals which is indicative of the second pulse train. The circuit extends from (−) battery through the winding of magnet BS, contacts 313, 241, 231, 222, 212 and 436 to ground (+). Off-normal contacts ON51 open when the Second Minor Switch takes its first step thus breaking the original energizing circuit for code pulse delay relay 240 which extended from (−) battery through the lower winding of relay 240, off-normal contacts ON51, contacts 418 and 225 to ground (+). Thereafter, code pulse delay relay 240 is held by its slow release characteristics for the duration of the second pulse train over a circuit which may be traced from (−) battery through its upper winding, contacts 313, 241, 231, 222, 212 and 436 to ground (+).

Code pulse delay relay 240 releases after the last digit pulse in the second pulse train has been received. Contacts 241 open thereby breaking the stepping circuit to magnet BS and contacts 242 close thereby completing a circuit to magnet CS. The numerical indication of the second digit pulse train is stored in the switch designated Second Minor Switch and nothing further happens until the calling subscriber transmits the third digit pulse train.

Calling bridge relay 210 restores and reoperates responsive to digit pulses in the third pulse train. A pulsing circuit is completed from ground (+) on contacts 436 through contacts 212, 222, 231, 242 and the winding of magnet CS to (−) battery. Relay 210 operates responsive to each digit pulse and the Third Minor Switch is driven at the rate of one step per pulse to register the particular digit that was dialed by the calling subscriber. Responsive to the first step that is taken by the Third Minor Switch, off-normal contacts ON53 open to de-energize the lower winding of code pulse delay relay 230. Thereafter it depends, for continued operation, upon its slow release characteristics and upon the pulse like energizing current that it receives over its upper winding each time that a digit pulse is received. The circuit through the upper winding may be traced from (−) battery through the upper winding of relay 230, contacts 242, 231, 222, 212 and 436 to ground (+).

Relay 230 releases after the last digit pulse in the third pulse train has been received. Responsive thereto, contacts 231 open to break the last stepping circuit over which a minor switch may be operated.

The three minor switches are standing off-normal with their brushes resting on terminals which represent the digits that were dialed into the code call circuit.

*Code call signal.*—The signaling phase of the code call is started by the operation of the off-normal relay after the last digit pulse has been repeated by the calling bridge relay and after code pulse delay relay 230 has released. The off-normal relay connects the output of a source of 60 impulses per minute ground pulses to control the pulse relay. The drawing shows this source by a conductor marked "60 I. P. M." although no special significance should be attached to the number "60" because other pulse speeds will do equally well. The pulse relay follows these ground pulses to perform two functions. First, it controls a rotary switch which hunts in search of markings that are indicative of the digits stored in the minor switches. When it is found, a signal relay is operated by this marking. Second, the pulse relay transmits a distinctive number of code call signal pulses over contacts of the signal relay after it operated. A circuit is completed to differentially energize and thereby release the signal relay at the end of a first series of signal pulses as indicated by another marking that is encountered by the rotary switch.

The rotary switch steps on to make one complete revolution under the influence of the pulse relay. During this time the signal relay is operated and released two more times. Each time that the signal relay operates, a circuit is completed for transmitting a series of signal pulses under the influence of the pulse relay. Hence, a total of three series of signal pulse trains are transmitted under the joint control of the rotary switch and pulse relay.

The rotary switch continues to rotate after that one revolution is completed. In this manner, the three series of signal pulses are repeated cyclically thereafter until either the calling subscriber abandons the call or a called party answers. In order to avoid the sending of a mutilated code, the lower bank of the rotary switch is wired to control the off-normal relay in a manner such that it is not possible to terminate the code call signaling responsive to subscriber answer until all three series of signal pulses have been transmitted.

In greater detail, these functions are completed in the following sequence of events.

Off-normal relay 330 operates over a circuit which may be traced from (−) battery through the lower winding of off-normal relay 330, contacts **426*b*, 232, the bottom bank on each of the minor switches, rest contacts 418 and operated contacts 225 to ground (+). Contacts 334 open thereby breaking still another point in the release circuit. Contacts 332 close thereby preparing a holding circuit for signal relay 340. Contacts 333** close for connecting the output (marked 60 I. P. M.) of a 60 impulse per minute source of ground pulses through an obvious circuit including the winding of pulse relay 320 and (−) battery.

Pulse relay 320 follows the output of the 60 impulse per minute source to pulse contacts 324 thereby cyclically energizing magnet RS to cause the switch designated Rotary Switch to operate and take its first step thereby driving its brushes BR51 and BR52 one step into the associated bank. The pulsing of contacts 324 causes the Rotary Switch to continue stepping at the rate of 60 steps per minute.

If it is assumed that the First Minor Switch is standing on its third set of terminals, a circuit is completed for operating signal relay 340 when the Rotary Switch reaches its third set of terminals. In detail, this circuit may be traced from ground (+) applied at contacts 331 through rest contacts 422, brush BR51, the third set of terminals in the rotary switch bank, the third set of terminals in the top bank of the First Minor Switch, the wiper which has been driven under the influence of the subscriber's dial to the third set of terminals and through the upper winding of signal relay 340 to (−) battery. Signal relay 340 operates.

Responsive to the operation of signal relay 340, contacts 342 close thereby locking this relay over the circuit extending from (−) battery through its upper winding and contacts 342 and 332 to ground (+). Contacts 341 close thereby preparing to terminate the transmission of the first series of code calling signals. Contacts 343 close thereby extending a circuit from code call signal device 121 to pulsing contacts 322.

Pulse relay 320 continues to be operated from the 60 impulse per minute source; therefore, contacts 322 are now effective for operating code call signal 121 in a pulse like manner. Assuming that code call signal 121 is a gong, bell or similar device, it is sounded at the rate of 60 I. P. M. Pulse relay 320 operates contacts 324 to drive brush BR51 three steps further, the code call signal device being sounded three times.

On the sixth step of the Rotary Switch, a circuit is completed through the lower winding of signal relay 340 so that it is differentially energized and therefore released. This circuit may be traced from (−) battery through the lower winding of relay 340, operated contacts 341, 351, the sixth set of terminals in the Rotary Switch, brush BR51, contacts 422 and 331 to ground (+). When signal relay 340 is differentially energized, contacts 343 open thereby terminating the first series of code cal signals. Contacts 342 open to remove the locking ground (+) marking which had been extended to the upper winding of signal relay 340.

The Rotary Switch continues to step under the influence of the 60 I. P. M. source. The second series of code call signals is sent when the Rotary Switch reaches the set of its terminals which are marked to operate signal relay 340 once more. For example, assume that the second digit which the calling subscriber transmitted into the code call circuit was the number "2," and the Second Minor Switch is standing with its brushes resting on its second set of terminals. A circuit is completed for operating signal relay 340 a second time when brush BR51 reaches terminal 10. This circuit may be traced from (−) battery through the upper winding of signal relay 340, the second step in the top bank of the Second Minor Switch, the tenth terminal in the Rotary Switch bank, brush BR51, contacts 422 and 331 to ground (+). When signal relay 340 operates, contacts 343 close once again to cause transmission of a code call signal. As relay 320 continues to be pulsed under the influenec of the 60 I. P. M. source, contacts 322 cause the sounding of code call signal 121 a second time. Contacts 324 continue pulsing to drive the Rotary Switch brushes further into its bank. A circuit is completed once again to differentially energize signal relay 340 when the Rotary Switch encounters its twelfth set of terminals. This circuit may be traced from (−) battery through the lower winding of relay 340, operated contacts 341, rest contacts 351, terminal 12 in the Rotary Switch bank, brush BR51, contacts 422 and 331 to ground (+). The signal relay is energized differentially and releases thereby opening contacts 343 to terminate the transmission of the second series of code call signals.

It is assumed that the third digit to be dialed into the code call circuit is the digit "3," and that the Third Minor Switch is standing with its brushes resting on its third set of terminals. Therefore, as the Rotary Switch continues to step under the influence of the 60 I. P. M. source, a circuit is completed at the fifteenth set of terminals for operating signal relay 340. This circuit extends from (−) battery through the upper winding of signal relay 340, the third terminal in the upper bank of the Third Minor Switch, terminal 15 in the rotary switch bank, brush BR51, contacts 422 and 331 to ground (+). Signal relay 340 operates and closes contacts 343 once again to allow the transmission of a code call signal each time that pulsing ground is extended from contacts 322. This causes the code call signal device to sound again in accordance with the third digit that was dialed by the calling subscriber. Signal relay 340 is differentially energized and is released a third time when the set of terminals marked "18" is encountered.

The mechanical structure of the rotary switch is such that brushes BR51 or their equivalent once again sweep from left to right over the rotary switch bank so that the same three series of code call signals are repeated cyclically until pulse relay 320 ceases to follow the 60 I. P. M. source of pulses. Ground (+) is connected through brush BR52 on every step of the Rotary Switch except the last which is marked "26," in the drawing. This ground marking is extended over a circuit which may be traced to (−) battery through the upper winding of off-normal relay 330, thus holding it in an operated condition. There is no ground marking on the final step of the lower bank of the Rotary Switch so that off-normal relay 330 is restored at the end of the code call if the called subscriber has answered. If not, off-normal relay 330 continues to hold operated over its lower winding, the circuit being from (−) battery through the lower winding of relay 330, contacts **426*b*, 232, the lower banks of the three minor switches, contacts 418 and 225** to ground (+). The ground marking which is applied to brush BR52 during rotary switch motion is provided to prevent the transmission of a mutilated signal which otherwise might be sent if the called subscriber should answer while the rotary switch is midway through one cycle.

*Answer.*—Briefly, it is assumed that a called party hears and recognizes his code. If he wishes to answer the call, he may go to a nearby telephone where he dials a code call answering number. Suitable switching equipment is directed by this answering number to seize answer terminals in the code call circuit. A thermistor starts to heat when these answer terminals are seized. A brief time delay period goes by to allow time enough to insure ring trip in the answering switching equipment. The cut-off relay in the code call circuit operates after a delay period that is provided by the time interval that is required for the thermistor to heat. The cut-off relay terminates ring trip and interconnects the calling and answering (or called) subscribers for conversation which follows. The code call signal is transmitted until a complete signal has been sent as indicated by absence of ground on the last terminal in the lower bank of the rotary switch. The off-normal relay releases responsive to this absence of ground thereby terminating the transmission of the code call signal. The pulse relay is disconnected from the 60 I. P. M. source and the rotary switch ceases to step.

Figure 4:
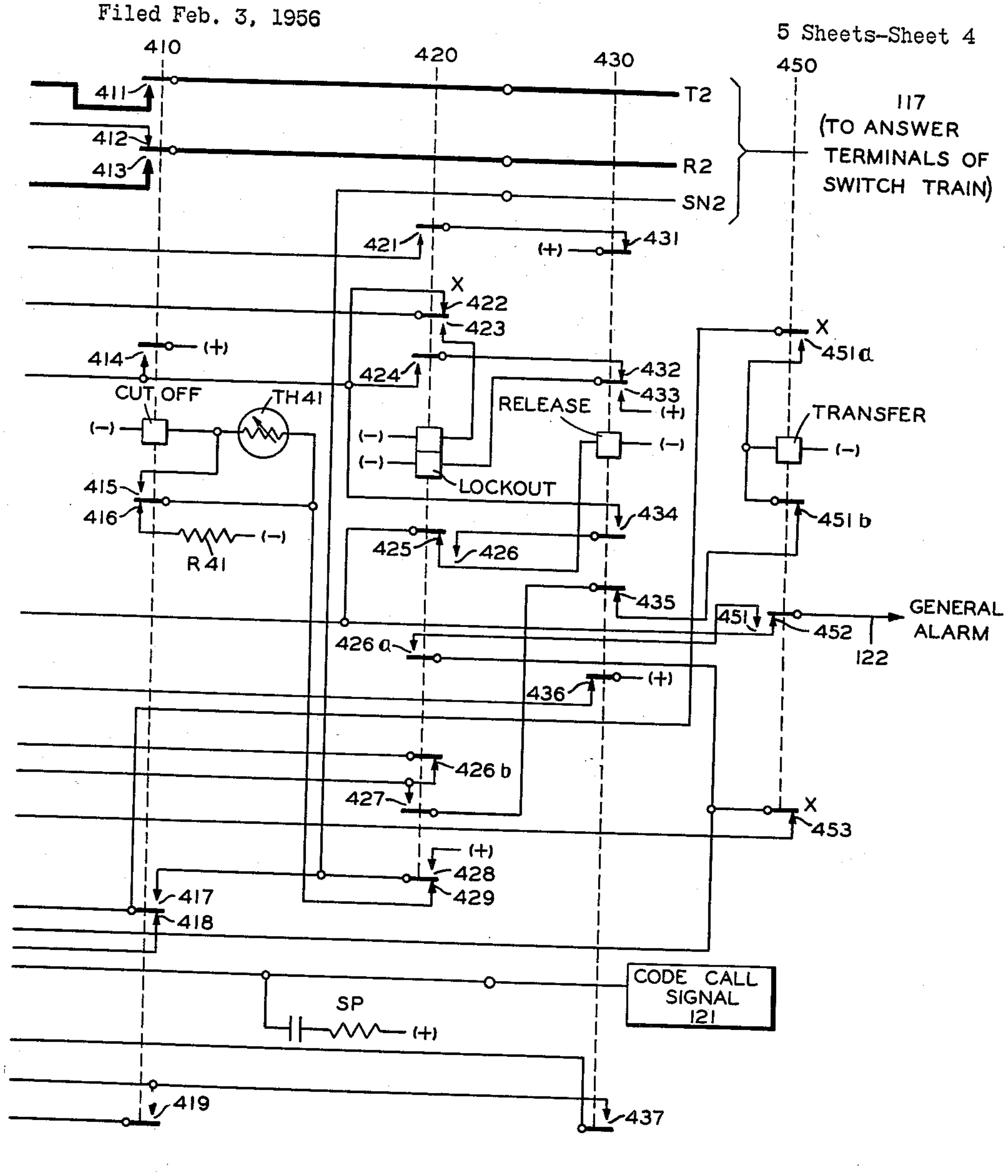
Figure 5:
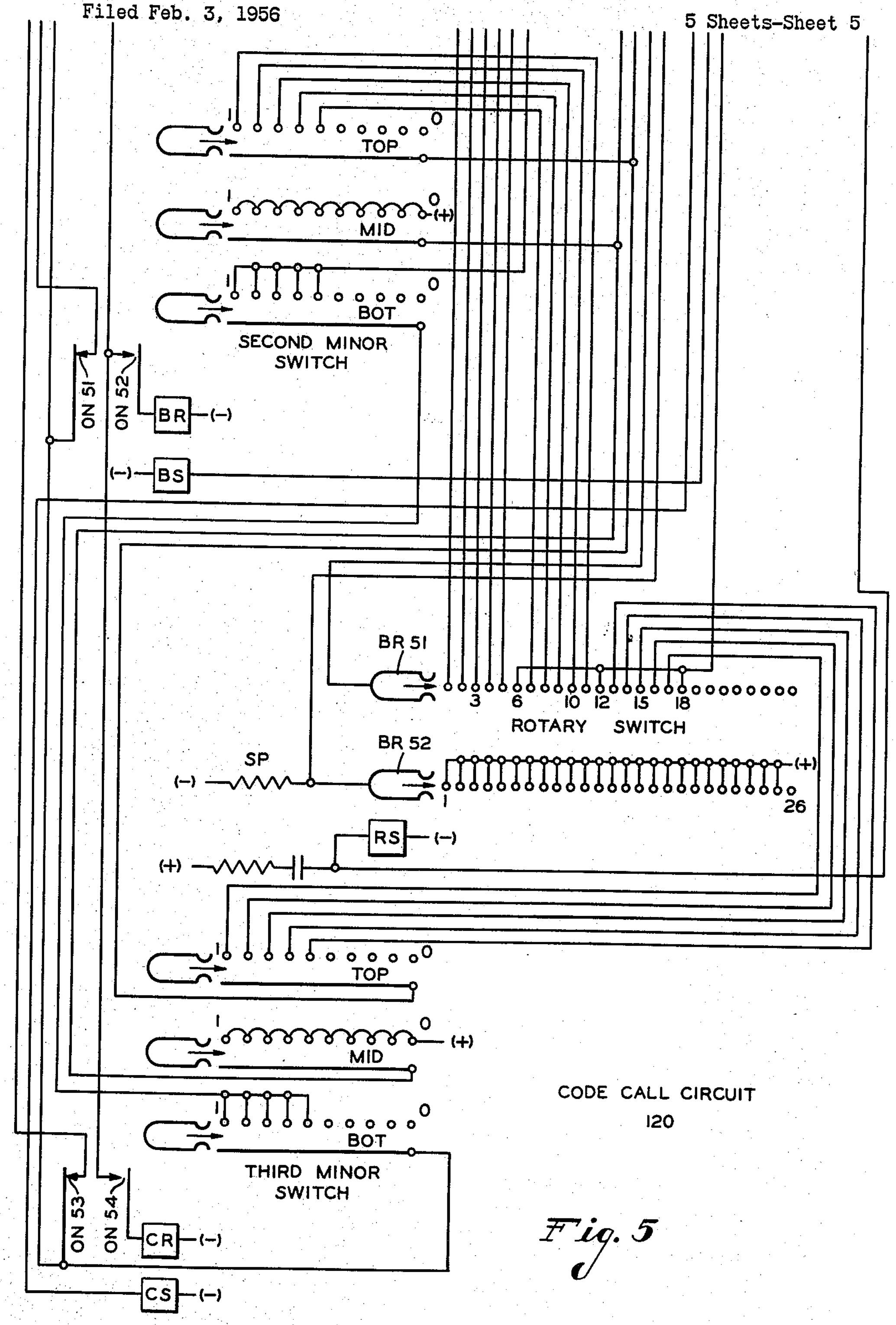

In greater detail, the answering subscriber, by dialing the answering number, causes connector 114 (Fig. 1) to seize the point of access that is marked "117." This is the same as conductors T2, R2 and SN2 (Fig. 4). Any suitable equipment (not shown) in connector 114 applies a ground (+) marking to sleeve conductor SN2 and extends ringing current over conductors T2 and R2. This ground (+) marking is extended through contacts 429, thermistor TH41 and the winding of cut-off relay 410 to (−) battery, thus causing it to operate after the expiration of the heat-up time for thermistor TH41. Contacts 412 and the associated ground marking are provided to trip ringing in the connector; therefore the heat-up time for thermistor TH41 is provided to insure ring-trip before contacts 412 open. Contacts 415 shunt thermistor TH41 to avoid excessive wear upon it. Contacts 411 and 413 close to complete the talking circuit between the calling and answering (or called) subscribers. Contacts 414 close to prepare an alternate circuit for the lower winding of code pulse delay relay 310. Ground (+) is returned to the connector through contacts 225, 417 and conductor SN2. Parenthetically, it might be noted that the code call circuit is marked idle by (−) battery extended through the winding of cut-off relay 410 and is marked busy by the above-traced circuit from ground (+) extended from contacts 225. Relay 410 locks over the circuit from (−) battery through its winding, contacts 415, 429, 417 and 225 to ground (+).

The off-normal relay 330 controls termination of the code call signal. Contacts 418 open when cut-off relay 410 releases thereby breaking one of the holding circuits for off-normal relay 330. It might be recalled that this relay originally operated over the circuit which may be traced from (−) battery through the lower winding of relay 330, contacts 426*b* and 232, the lower bands of the various minor switches, contacts 418 (now open) and 225 to ground (+). Another circuit for the off-normal relay also may be traced from (−) battery through the upper winding of off-normal relay 330, brush BR52 and the lower bank of the Rotary Switch to ground (+), if the Rotary Switch is standing on any terminal other than on its last set marked "26," in the drawing. If the Rotary Switch is standing on other than the last terminal, it continues to step until it has transmitted a complete code call signal and has reached the terminal 26. If the rotary switch is on the last terminal when answer supervision is received, or, if not, then when it encounters the last terminal, there is no ground (+) marking for the upper winding of off-normal relay 330. Off-normal relay 330 releases and opens contacts 331 thereby removing a ground (+) marking which is now duplicated at contacts 414. Contacts 332 also open to de-energize the upper winding of signal relay 340 which releases. Contacts 334 close to prepare part of the release circuit for the minor switches. Contacts 333 open thereby disconnecting the 60 I. P. M. source from control of pulse relay 320.

When relay 320 discontinues pulsing, contacts 324 cease pulsing so that the rotary magnet RS is not reenergized to drive the Rotary Switch any further.

Nothing further happens until the calling subscriber hangs up.

*Release.*—Release is strictly under the control of the calling subscriber. Calling bridge relay 210 restores thus opening contacts 211 to restore release delay relay 220. Responsive thereto, contacts 221 open to remove the busy ground marking extended over conductor S and to restore the preceding switching equipment which had been holding from this ground. Contacts 225 open and ground (+) is removed from conductor SN2 thereby marking the code call circuit as idle to answer equipment, assuming that the called party has released. If not, ground is applied to conductor SN2 by connector 114 until the called party does release. Contacts 225 open thereby releasing cut-off relay 410 which was being held over a circuit that may be traced from ground (+) through contacts 225 (now open), 417, 429, 415 and the winding of cut-off relay 410 to (−) battery. Contacts 226 close thereby completing a release circuit from ground (+) on the release alarm conductor through contacts 334, 226, the various off-normal contacts ON22, ON52 and ON54 to the respective windings of the release magnets AR, BR and CR. Each of the Minor Switches restores responsive to the completion of this circuit. During this period while the Minor Switches are restoring or in case they fail to restore completely, relay 310 reoperates to mark code call circuit 120 as busy by applying ground (+) at contacts 311. The circuit for operating this relay extends from ground (+) through the middle bank of one or more of the Minor Switches, contacts 224, and the lower winding of relay 310 to (−) battery. Relay 310 operates and applies a busy ground at contacts 311. This marking is removed when the minor switches release completely.

Relay 410 releses and opens contacts 411 and 413 thereby breaking the conversation path.

Code call circuit 120 is now restored to normal and nothing further happens until the next call is placed.

*General alarm*

The words "general alarm" are used in this specification to denote signals which are to be sounded through a large general area, such as an entire factory, for example, as distinguished from a small or limited area, such as a particular department in that factory. The reason for sounding the alarm is not material, for example, the alarm could signify a fire, an air raid, a natural disaster, or the like. Any suitable means may be provided for applying a marking of ground potential to a general alarm conductor upon the occurrence of an alarm condition; for example, a pull switch may be used. The alarm and release relays operate responsive to this ground marking. The alarm relay causes the termination of a code call signal, if any is then in process, and causes the sounding of a steady alarm signal. The release relay initiates various circuit operations which, if a code call is in process, releases the calling switching means and the minor switches, and renders the answering switching equipment ineffective. The code call circuit is marked busy except that an attendant may seize it over a separate point of access to control the transmission of a special or area alarm.

In greater detail, a general alarm is transmitted to code call circuit 120 in the form of a ground (+) marking that is connected by any suitable equipment, such as a fire alarm call box, for example, to alarm conductor 122. This ground (+) marking is extended over contacts 452, 425, and through the winding of release relay 430 to (−) battery. This same ground marking is also extended through contacts 452 and the winding of alarm relay 350 to (−) battery. Both of these relays operate.

When relay 350 operates, it opens contacts 351 thereby preventing any differential energization which might release signal relay 340. Contacts 352 close to energize the upper winding of signal relay 340 and thus to operate it for the duration of the general alarm. Contacts 343 close in preparation for the transmission of a steady alarm signal. Off-normal relay 330 is operated (or held operated) over the circuit which may be traced from (−) battery through the upper winding of off-normal relay 330, resting contacts 453 and operated contacts 353 to ground (+). Off-normal relay 330 operates and closes contacts 332 for completing an alternate circuit to the upper winding of signal relay 340. Contacts 333 close thereby extending the output of the 60 I. P. M. source over an obvious circuit to operate and release pulse relay 320. Contacts 322 now operate and release at the steady rate of 60 I. P. M., thereby operating the code call alarm signal at the steady rate of 60 I. P. M.

Next, reference is made to the function of release relay 430 as it responds to the occurrence of an alarm. Contacts 431 are not important at this time because contacts 421 are open. Contacts 436 open thereby removing the master ground (+) which had been used to hold release delay relay 220 in an operated condition. That circuit had extended from (—) battery through the winding of relay 220, operated contacts 211 and rest contacts 436 to ground (+).

Release delay relay 220 restores. Responsive thereto, contacts 221 open thereby removing the holding ground that was returned to the preceding switching equipment thus causing it to release. The code call circuit is now marked idle; however; as will be explained presently, this idle marking is replaced by a busy ground after a period of time that is designed to allow the preceding switching equipment to release. This is called "wink-off." There is only a slight chance that switching equipment may be directed to seize code call circuit 120 during the brief "wink-off" interval while the busy line marking is removed. Contacts 226 close thereby completing a circuit for releasing the Minor Switches. This circuit extends from the release alarm conductor through contacts 437, 226, the various off-normal contacts ON22, ON52 and ON54, and windings of the release magnets AR, BR and CR to (—) battery. The Minor Switch or switches are returned to normal, thus clearing any code which might have been registered at this time.

Returning to the operation of relay 430, lockout relay 420 operates over an obvious circuit responsive to the closure of contacts 433. Busy ground (+) marking is extended from contacts 428 over conductor SN2 to the answering terminals (point of access 117). If cut-off relay 410 is operated, it releases when contacts 429 break. This in turn opens contacts 411 and 413 thereby disconnecting tip and ring conductors T2 and R2 of the answer line from the code call circuit so that the answering party is effectively disconnected. Contacts 427 have no function at this time. Contacts 425 open to break the circuit extending from alarm conductor 122 to release relay 430. Parenthetically, contacts 422 are "X" or preliminary contacts which open before any of the other contacts controlled by relay 420 operate; hence, release relay 430 is restored when contacts 425 open. Contacts 423 close to hold relay 420 in an operated condition depending upon the circuit which extends from (—) battery through the upper winding of relay 420, operated contacts 423 and 331 to ground (+). With contacts 431 closed, a busy ground marking is extended to conductor S. This marks the end of the "wink-off" time period mentioned above.

The code call circuit is now in lockout, the preceding switch train has been restored, and each point of access to the code call circuit is marked as busy. Nothing further happens until either the general alarm signal is terminated, or until an attendant takes over the control of the code call circuit.

*Attendant control.*—It is assumed that the attendant wishes to change the general alarm to an area alarm, or, for some other reason, wishes to control the transmission of the alarm signals. As pointed out above, responsive to a general alarm condition, the Minor Switches are released and master ground is removed by operation of the release relay so that the code call circuit is returned to normal after which master ground is reapplied by restoration of the release relay so that the code call circuit is ready for reoperation except that all points of access that are available to regular code calls are now marked busy. Therefore, to transmit an area alarm signal, it is only necessary for the attendant to plug into a special jack that is not barred by a busy marking and to dial an area alarm directory number. Responsive thereto, the Minor Switches are reoperated to register the area alarm number that is dialed by the attendant. The general alarm is terminated and the code call circuit functions as in the case of regular code calls except that this time the signal is by preassignment used to designate a certain area.

More specifically, the attendant seizes code call circuit 120 over the point of access that includes jack 200. It is noted that access over this jack is not limited by the busy marking.

Calling bridge relay 210 operates over an obvious loop including jack 200. Responsive thereto, a circuit is completed from ground (+) on contacts 436 through operated contacts 211 and the winding of release delay relay 220 to (—) battery. The attendant may proceed to dial and control code call circuit 120 in the manner explained above in connection with the code call placed by subscriber A. The various Minor Switches are set to register a particular code depending upon the number dialed by the attendant. When the Third Minor Switch has been set under the influence of digit pulses transmitted by the attendant, a circuit for transfer relay 450 is completed from (—) battery extended through the winding of transfer relay 450, rest contacts 451*b*, 435, operated contacts 427, rest contacts 232, the bottom banks of the three Minor Switches, contacts 418 and 225 to ground (+). Transfer relay 450 operates.

Responsive to the operation of relay 450, "X" or preliminary contacts 453 open first thus breaking a possible holding circuit for alarm relay 350. Also, "X" or preliminary contacts 451*a* close to lock relay 450 over the circuit from (—) battery through the winding of relay 450, contacts 451*a* and 225 to ground (+). Immediately thereafter, contacts 452 open and 451 close. In this manner, alarm relay 350 is placed under the control of brush BR52 and the lower bank in the Rotary Switch. The Rotary Switch now controls the transmission of the code call signal. When terminals 26 are encountered by brush BR52, there is no ground for holding relay 350 so that it releases thereby marking the start of a code call signal. The positions on which the Minor Switches are standing determines which signals will be transmitted. These signals are, by preassignment, an area alarm which is useful for directing any suitable emergency apparatus to a particular location. The transmission of the area alarm continues in the manner described above in connection with the regular code call alarm.

If the attendant releases the circuit before the general alarm marking has been removed from conductor 122, a general alarm is resignaled. On the other hand, if the attendant continues to control the code call circuit 120 until the termination of the general alarm, the circuit is returned to idle when the attendant disconnects.

While I have shown a single embodiment of my invention, it should be understood that various modifications may be made without departing therefrom. Therefore, I intend to cover in the attached claims not only the specific features that are shown, but also all modifications that may fall within the true spirit of my invention.

What I claim is:

1. In a telephone system, means for controlling the transmission of code call signals, means for extending a calling line to said first named means, means for registering particular code call designations in said first named means responsive to receipt of signals from said calling line, means for transmitting distinctive code call signals in accordance with said registration of said particular designations, means for extending an answering line to said first named means for answering code calls, means responsive to said last named means for causing said first named means to halt the transmission of said distinctive code call signals, means responsive to an alarm condition for causing said first named means to transmit a general alarm, means also responsive to said alarm condition for releasing said calling line, means also responsive to said alarm condition for rendering said answering line ineffective, means also responsive to said alarm condition for marking said first named means as busy to other calls during said alarm condition, means for seizing said first named means during said alarm condition and means for causing said first named means to halt said transmission of said general alarm and to transmit an area alarm.

2. In a telephone system, means for controlling he transmission of code call indications, means for extending a calling line to said first named means via a first point of access, means for transmitting digit pulses over said calling line, means for registering particular designations in said first named means responsive to said digit pulses, means for transmitting distinctive signals in accordance with said registration of said particular designations, means for extending an answering line to said first named means via a second point of access, means responsive to a general alarm condition for seizing said first named means, means responsive to said last named means for causing said first named means to transmit a general alarm signal, means also responsive to said alarm condition for releasing said calling line, means also responsive to said alarm condition for rendering said answering line ineffective, means also responsive to said alarm condition for applying a busy marking to said means for seizing said first named means via a third point of access during said alarm condition, and means effective over said third point of access for causing said first named means to terminate the transmission of said general alarm signal and for causing said first named means to transmit an area alarm signal.

3. In a telephone system, code call control means, means for extending a first telephone line to said code call control means, means for transmitting digit indications over said calling line, means for registering said indications in said code call control means, means for transmitting a distinctive code call signal depending upon said digit indications as registered in said code call control means, means for extending a second telephone line to said code call control means, means responsive to a general alarm for seizing said code call control means and for causing the transmission of a general alarm signal, means responsive to said general alarm for releasing said first line, means also responsive to said general alarm for marking said code call control means on busy, and means also responsive to said general alarm for releasing said registration means.

4. The telephone system of claim 3 and means also responsive to said general alarm for disabling said second telephone line.

5. The telephone system of claim 3 and means for terminating the transmission of said general alarm signal and for substituting therefor a particular limited alarm signal.

6. The telephone system of claim 3 wherein said code call control means is provided with a point of access that is not barred to certain calls during periods when said means is applying said busy marking responsive to said general alarm, means for seizing said code call means over said point of access to complete one of said certain calls during said general alarm condition, means for transmitting digit indications over said point of access, said last named digit indications being registered in said registration means, and means responsive to said last named registration for terminating the transmission of said general alarm signal and for substituting therefor a limited alarm signal which is transmitted according to said last named registration.

7. The telephone system of claim 3 and means controllable from an attendant's cabinet for seizing said code call control means during said general alarm condition, and means responsive to digit indications transmitted from said attendant's cabinet for terminating the transmission of said general alarm signal and for substituting therefor a particular limited alarm signal.

8. In a telephone system, code call control means, means in said code call control means for registering digit indications, means for transmitting code call signals depending upon said digit indications as registered in said code call control means, means for transmitting a general alarm marking to said code call control means, means for transmitting a general alarm responsive to said marking, means in said code call control means effective responsive to said marking for releasing calls in process, means in said code call control means also effective responsive to said marking for releasing said register means, means for thereafter registering other digit indications in said register means, and means responsive to said last named means for halting said transmission of said general alarm signal and for substituting therefor a limited alarm responsive to said other digit indications.

References Cited in the file of this patent

UNITED STATES PATENTS

| | | |
|---|---|---|
| 2,303,015 | Beaumont | Nov. 24, 1942 |
| 2,491,903 | Pearce | Dec. 20, 1949 |
| 2,513,964 | Pearce et al. | July 4, 1950 |
| 2,552,797 | Lomax | May 15, 1951 |
| 2,584,210 | Kessler | Feb. 5, 1952 |
| 2,717,923 | Pharis | Sept. 13, 1955 |

UNITED STATES PATENT OFFICE

CERTIFICATE OF CORRECTION

Patent No. 2,848,550 August 19, 1958

William W. Pharis

It is hereby certified that error appears in the printed specification of the above numbered patent requiring correction and that the said Letters Patent should read as corrected below.

Column 6, line 41, for "operated" read -- operates --; column 7, line 48, for "cal" read -- call --; column 9, line 30, for "bands" read -- banks --; column 10, line 14, for "releses" read -- releases --; column 13, line 3, for "he" read -- the --; line 41, for "means on" read -- means as --.

Signed and sealed this 10th day of March 1959.

(SEAL)
Attest:

KARL H. AXLINE
Attesting Officer

ROBERT C. WATSON
Commissioner of Patents